United States Patent [19]

Emerson

[11] Patent Number: 5,285,450
[45] Date of Patent: Feb. 8, 1994

[54] INBAND COMMUNICATIONS IN A DIGITAL COMMUNICATIONS SYSTEM

[75] Inventor: Earl Emerson, Somerset, N.J.

[73] Assignee: Integrated Network Corporation, Bridgewater, N.J.

[21] Appl. No.: 859,053

[22] Filed: Mar. 27, 1992

[51] Int. Cl.$^5$ .............................................. H04J 3/12
[52] U.S. Cl. ..................................... 370/110.1; 370/99
[58] Field of Search ..................... 370/56, 58.1, 58.2, 370/58.3, 66, 68, 68.1, 99, 110.1, 111; 379/229, 231, 234, 237, 240, 268, 290

[56] References Cited

U.S. PATENT DOCUMENTS

| | | | |
|---|---|---|---|
| 4,232,386 | 11/1980 | McDonald et al. | 370/68 |
| 4,245,340 | 1/1981 | Landry | 370/111 |
| 4,394,756 | 7/1983 | Canniff | 370/110.1 |
| 4,434,486 | 2/1984 | Barner, Jr. et al. | 370/110.1 |
| 4,636,584 | 1/1987 | Binkerd et al. | 379/240 |
| 4,849,972 | 7/1989 | Hackett et al. | 370/110.1 |
| 4,849,977 | 7/1989 | Baun, Jr. et al. | 371/49 |
| 4,995,076 | 2/1991 | Joffe et al. | 379/229 |
| 5,046,067 | 9/1991 | Kimbrough | 370/110.1 |
| 5,144,624 | 9/1992 | Sharper et al. | 370/110.1 |
| 5,144,625 | 9/1992 | Cain et al. | 370/110.1 |
| 5,166,923 | 11/1992 | Ohmori et al. | 370/15 |

OTHER PUBLICATIONS

"Digital Data System Data Service Unit Interface Specification", Bell System Data Coommunications Technical Reference, Nov. 1981.

"Special Access Connections to the AT&T Communications Network for New Service Applications", AT&T Technical Reference, Oct. 1985.

Primary Examiner—Douglas W. Olms
Assistant Examiner—Alpus H. Hsu
Attorney, Agent, or Firm—Hamilton, Brook, Smith & Reynolds

[57] ABSTRACT

In a digital communication system, select devices are capable of generating and detecting data sequences that are normally suppressed by end user equipment for establishing inband communications among the select devices. Select devices capable of participating in inband communications may include the controller, Digital Channel Units (CUs) and Customer Premises Equipment (CPEs). Inband communications is initiated by a select device by transmitting a sequence comprising a plurality of first bytes for preventing inadvertent initiation of maintenance operations for digital devices in a particular time slot, followed by a plurality of second bytes. Inband communications is established when the select device receives a sequence comprising a plurality of said first bytes, a plurality of bytes which identify the select device and a plurality of said second bytes. Once established, inband communications can then be used to accomplish automated provisioning, performance reporting, status reporting, alarm reporting as well as other important functions. Significantly, the capability to establish inband communications can result in substantial savings in the installation, maintenance and operations of digital networks. Ultimately this capability will allow performance of the above-described functions from a centralized location, thereby saving on the manual dispatches typically required to perform those functions.

11 Claims, 5 Drawing Sheets

INBAND COMMUNICATIONS IN A DIGITAL COMMUNICATIONS SYSTEM

BACKGROUND OF THE INVENTION

The use of completely digitized communication systems such as the Integrated Service Digital Network (ISDN) is becoming more common. Such systems offer voice, data, and graphical transmissions to the consumer. By replacing analog voice systems with digital capability, tremendous amounts of information of high quality can be transmitted along copper wires which are used as digital channels.

To carry a digital signal on an analog line, a modem must be used to generate signals of different frequency to represent digital bits. By comparison, a completely digital system does not require a modem. Network interface devices are used to access the system. The standard data rate for an ISDN system is 64 kilobits per second (Kbps). Terminal equipment such as a D4 bank or digital private exchange (PBX) can be used to interface a plurality of terminal equipment with a central exchange device. For example, the D4 bank can service 24 remote subscribers, each having a transmit line and a receive line which can operate at up to 64 Kbps. As noted above, digitized voice, data, video, and graphics can be transmitted from each remote subscriber. Moreover, bulk data transfers can be accomplished by using all 24 remote channels simultaneously.

Digital communication systems supply large amounts of data, voice, and video information at a high signal to noise ratio with a minimum of distortion and efficient interface transfer capability. To assure that such a digital system operates at its optimum characteristic, each communication channel in the system must be fully operational and in the proper state. Presently, manual adjustment the individual channel units for each channel is required to enable the channel to perform such functions as automated provisioning, performance reporting, status reporting, alarm reporting. These manual methods are typically awkward, inefficient and labor intensive.

SUMMARY OF THE INVENTION

In a time division multiplexed (TDM) digital communication system, a digital terminal time multiplexes signals received from a plurality of lines into communication channels (or time slots) so that they may be transmitted over a single communications line. At the remote end of the line, the signals are converted in a like digital terminal and distributed on a plurality of channels (or time slots) to remote end users. End users employ Customer Premises Equipment (CPEs) which are coupled to a digital terminal via digital channel units (CUs) to access the system and communicate with other end users.

In a digital system comprising CPEs with a 64 kbps data rate capability being coupled to a digital terminal via digital channel units (CUs), a 64 kbps CPE employs data formatting circuitry to transmit data sequences over the system to other CPEs. The data formatting circuitry formats the data into a series of 8-bit bytes referred to as a transmit sequence. Since each byte in the transmit sequence has data in all 8-bits, a limited set of data sequences are reserved for initiating maintenance operations for a device (CU or CPE) in the system. To initiate maintenance operations, a controller transmits a maintenance sequence to a device. Responsive to the maintenance sequence, the device configures its maintenance circuitry for maintenance operations.

To maintain a reserved set of data sequences for maintenance operations, a suppression circuit is employed in 64 Kbps CPEs for suppressing transmission of specific customer data sequences. The suppression circuit serves to prevent 64 kpbs CPEs from introducing a maintenance sequence into the system and inadvertently activating maintenance operations in the system. Thus, only the controller can introduce a maintenance sequence into an existing system for inititating maintenance operations. These suppressed sequences provide the basis for the present invention.

In accordance with the present invention, select intelligent devices for use in a TDM digital communication system are provided and accomplish functions such as automated provisioning, performance reporting, alarm reporting and status information in time slots without affecting existing (unselect) devices in the system. These select devices replace the digital terminal's controller and certain digital CUs and CPEs without disruption of an entire existing system. These select intelligent devices are fully compatible with existing devices in the existing system.

In preferred embodiments, these select devices generate and detect data sequences in associated time slots for establishing "inband" communications among the select devices. "Inband" communications refers to an exchange of data sequences in a time slot between select intelligent devices capable of properly processing said sequences and at the exclusion of other devices associated with the time slot. Accordingly, select devices establish inband communications in associated time slots by using a data sequence which comprises a series of data bytes normally suppressed by 64 kbps CPEs in preserving maintenance operations and a series of data bytes for resetting maintenance circuitry of other devices associated with the time slot so as to not inadvertantly initiate maintenance operations in the other devices. In accordance with the present invention, the select digital channel units preferably employ an apparatus for establishing and maintaining inband communications without interfering with or interference from existing devices in the system. Further, a plurality of select intelligent CPEs may also be employed in the system. Each select CPE comprises said apparatus for transmitting and receiving digital data in its associated time slot for participation inband communications with the controller.

The controller and select intelligent devices (CUs and CPEs) establish inband communications by generating and detecting data sequences which comprise a series of data bytes suppressed by 64 kbps CPEs in preserving system maintenance operations. These data sequences also comprise a series of reset data bytes so that the sequences do not accidently activate maintenance operations in other devices in the system. Thus, the data sequences employed for establishing inband communications also preserve system maintenance operations.

One preferred data sequence is a basic inband sequence transmitted by a select device to indicate that it is available to participate in inband communications. The basic sequence comprises a predetermined number of Transition In Progress (TIP) bytes which are known in the art and serve to reset all devices (CUs and CPEs) associated with the time slot. The series of TIP bytes is immediately followed by a predetermined number of Loopback Enable (LBE) bytes which correspond to a data sequence suppressed by many existing CPEs. Responsive to the basic sequence, the controller establishes inband communications with the select device by generating a sequence comprising a plurality of said TIP bytes, a plurality of bytes which may serve to identify the select device or a reporting function and a plurality of LBE bytes. In other situations, a select device and the controller may exchange sequences comprising TIP bytes, bytes for identifying the select device or a reporting function and LBE bytes for establishing inband communications.

Once established, inband communications can be used to accomplish automated provisioning, performance reporting, status reporting, alarm reporting as well as other important functions. Significantly, the capability to establish inband communications can result in substantial savings with respect to the installation, maintenance and operations of digital communications networks. Ultimately this capability will allow performance of the above-described functions from a controller at a centralized location, thereby saving on the manual dispatches typically required to perform those same functions.

The above and other features of the invention including various novel details of construction in combination of parts may now be particularly described with reference to the accompanying drawings and pointed out in the claims. It will be understood that the particular device embodying the invention is shown by way of illustration only and not as a limitation of the invention. The principles and features of this invention will be employed in varied and numerous embodiments without departing from the scope of the invention.

DETAILED DESCRIPTION OF THE INVENTION

I. General Description of the Communication System

Figure 1:
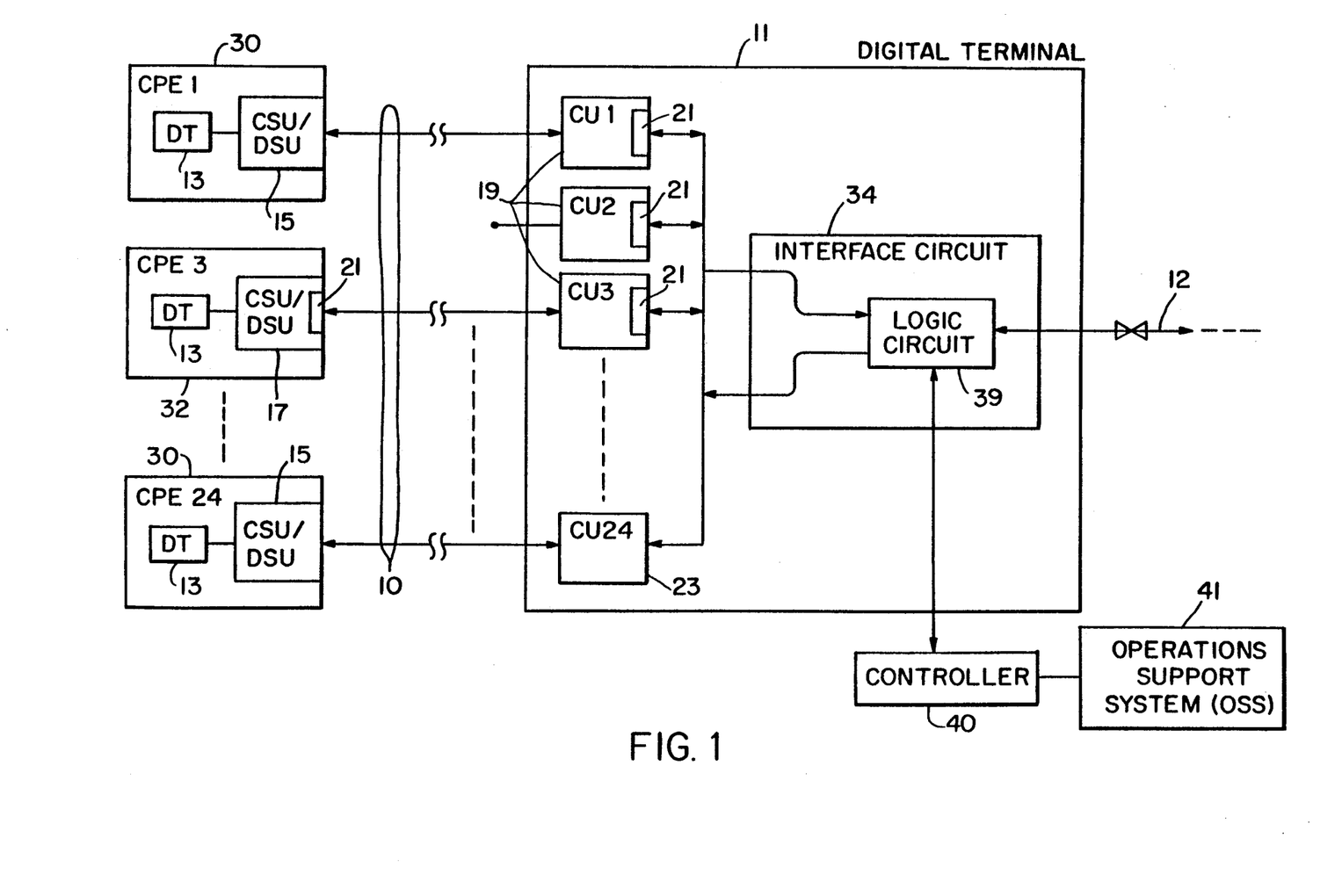
FIG. 1 is a block diagram of a time multiplexed communication system employing the present invention.

A digital communication system embodying the present invention is shown in FIG. 1. A Digital Terminal 11 multiplexes signals received from multiple lines 10 forming communication channels so that they may be transmitted over a single communications line 12. At the remote end of the line 12 (not shown), the signals are converted in a like Digital Terminal and distributed onto multiple lines to remote end users. End users employ Customer Premises Equipment (CPEs) 30, 32 to access the system and communicate with other end users. A first type of CPE 30 is known in the art, such as the CPE described in U.S. Pat. No. 4,849,972 to Hackett et al. incorporated herein by reference. A second type of CPE 32 employs a Customer Service Unit/Data Service Unit (CSU/DSU) 17 embodying the processor circuit 21 of the present invention as described below. Both types of CPE 30, 32 comprise a Data Terminal (DT) 13 and a Customer Service Unit/Data Service Unit (CSU/DSU) 15, 17. Each DT 13 employs a computer which generates a serial data stream for transmission over the data communication system to a remote DT (not shown). The CSU/DSU receives the serial stream from the DT and transforms it into a system compatible format for transmission over the system to the remote DT.

The Digital Terminal 11 also comprises digital Channel Units (CUs) 19 and 23, each of which is associated with one of the digital signal lines 10. A first type of CU 23 is known in the art, while a second type of CU 19 employs a circuit 21 of the present invention which is described below. The digital CUs are coupled to interface circuitry 34 which is, in turn, connected to the digital communications line 12. The interface circuitry 34, which includes circuitry 39 of the present invention, is controlled by a controller 40. An Operations Support System (OSS) 41 programs the controller 40.

Typically, maintenance operations are initiated when two CPEs (end users) cannot communicate. The maintenance tests are individually performed on each CU and CPE associated with a channel. Maintenance operations are first performed on each CU and CPE associated with a particular channel. Next, maintenance operations are performed on each remote CU and CPE associated with the same channel, but located on the right-hand side and coupled to the Digital Terminal 11 via the digital line 12.

II. Coding Format

In a communication system having CPEs, CSU/DSUs with only a 56 kbps data rate capability within the CPEs format the customer data into sequences of 8-bit bytes. Each byte in a sequence has data in the first 7-bits data and no data in the eighth bit. The eighth bit in each byte is used to indicate whether the byte is a data byte or control information (such as maintenance codes). As such, the controller 40 initiates maintenance operations for a given device (i.e. CU or CSU/DSU) by generating a maintenance sequence. The presence of a network control indicator in the eighth bit of each byte serves as an indicator to devices in the system that the sequence is intended for maintenance operations.

Figure 2:
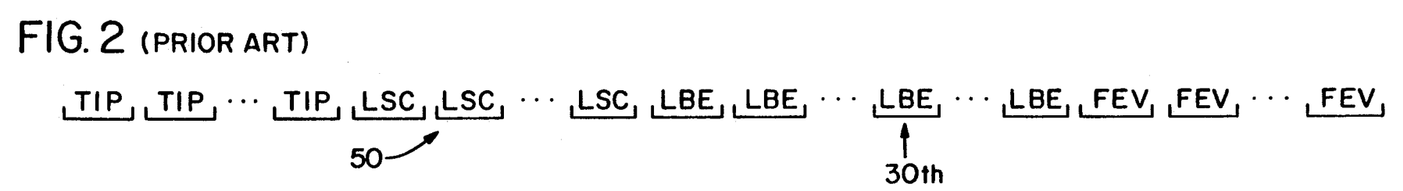
FIG. 2 illustrates a prior art maintenance sequence used in the system of FIG. 1.

In a communication system having CPEs employing CSU/DSUs with a 64 kbps data rate capability, the eighth bit of each byte is not reserved for maintenance operations as 64 kbps CSU/DSUs format data into all eight bits of every byte. Thus, to allow for maintenance testing of each communication channel (or time slot) comprising 64 Kbps CPEs, digital communication systems have a limited set of data sequences reserved to the controller 40 for initiating maintenance operations. For example, in the digital communication system of FIG. 1, the controller 40 initiates maintenance operations in a time slot associated with a plurality of devices (such as CPE24 and CU24) by transmitting a sequence (shown in FIG. 2). Referring to FIG. 2, the sequence comprises a plurality of a first data byte—Transition In Progress (TIP) bytes, a plurality of second data bytes—Loopback Select Code (LSC) bytes, a plurality of a third data byte —Loopback Enable (LBE) bytes, and a plurality of a fourth data byte—Far End Voice (FEV) bytes. The 5 bit format of these bytes is the standard format as defined in AT&T Publication 62310 (Bellcore TA-TSY-77), Digital Data System Channel Interface Specification", November 1987 and Bellcore TA-TSY-000077, "Digital Channel Banks. —Requirements for Datapoint Channel Unit Functions", Issue 3, Apr. 1986 and is as follows:

TIP=S0111010
LSC=SDDDDDD1
LBE=S1010110
FEV=S1011010 where S is a subrate framing bit which, for detection purposes, is ignored and DDDDDD is a 6-bit code identifying the type of device. CPE24 and CU24 have maintenance circuitry configured to detect the above-described sequence such that only one device undergoes maintenance testing at a time. The TIP bytes serve to reset the maintenance circuitry in each device. Further, the maintenance circuitry of each device in a channel is usually configured to recognize a unique LSC byte. For example, as shown in FIG. 2, the LSC bytes of the sequence 50 may only be recognized by the maintenance circuitry of CU24 which would subsequently receive LBE bytes and FEV bytes and undergo maintenance testing. The maintenance circuitry of CPE24 would continue waiting for its associated LSC bytes.

In some configurations, both CPE24 and CU24 have maintenance circuitry configured to recognize the same LSC byte. In such configurations, after processing the LSC bytes, the maintenance circuitry of both devices begins receiving LBE bytes. However, as stated above, the maintenance circuitry in both devices has the ability to ensure that maintenance testing is performed on only one device at a time. The circuitry does this by entering a "mapping" mode. After receiving the 30th LBE, the device nearest to the controller (CU24 in this example) enters the mapping mode. During the mapping mode, the maintenance circuit of CU24 disables the output of CU24, preventing data from the controller from being received by the remote device (CPE24). Instead, the maintenance circuitry of CU24 transmits a mapping output which is received by CPE24. The mapping output is a sequence of identical map code bytes. As defined in the AT&T and Bellcore references, each map code byte corresponds to the bit sequence 10010011 or 01101101. While in the mapping mode, CU24 continues receiving LBE bytes followed by FEV bytes. After receiving the requisite number of FEV bytes, CU24 enters the latching loopback state to support maintenance testing. When in the latching loopback state, the maintenance circuitry of CU24 is configured to accept loopback data from the controller and simply send the data back to the controller.

To provide 64 Kbps access to CPEs in a digital communication system, while still reserving a set of data sequences to support maintenance operations, a limited set of customer data sequences are suppressed by CSU/DSUs. A suppression circuit in each CSU/DSU prevents 64 kpbs CPEs from accidentally introducing a maintenance sequence into the system and inadvertently activating the mapping mode or latching loopback in a device. Accordingly, one of two possible suppression algorithms are employed by a CSU/DSU suppression circuit. The first is a suppression algorithm utilized by AT&T which requires that the transmission of more than 30 LBE bytes in any sequence of 32 bytes following any sequence of 30 or more consecutive identical bytes must be suppressed. The second is an ANSI suppression algorithm which requires that the transmission of any 40 consecutive bytes that includes more than 29 LBE bytes will be suppressed.

In accordance with the present invention, the data sequences suppressed by CSU/DSUs provide the basis for inband communications. By selecting a proper sequence which includes a suppressed sequence and which does not inadvertently activate the mapping mode or latching loopback in a device, inband communications may be established between select devices without affecting other devices in the system.

III. Inband Communications

The present invention comprises inband circuitry 21 and 39 that takes advantage of these suppressed codes by generating data sequences for establishing inband communications between a select device and a controller. Once established, the inband communications link may be utilized for a number of operations such as provisioning, performance reporting or diagnostics. It is noted that in the present invention a controller includes any device capable of performing a control function, a provisioning function, a diagnostics function or a reporting function.

Select devices employing inband circuitry 21 and 39 of the present invention are compatible with existing communication systems. As such, an entire system need not be replaced to incorporate a controller, CUs and CPEs having the inband communication capability. Further, CUs and CPEs employing inband circuitry 21 may be coupled into the system in a variety of combinations.

Referring to FIG. 1, on one channel a CU 19 (CU1) having inband circuitry 21 is coupled to an existing CPE 30 (CPE1). In this configuration, only CU1 can participate in inband communications with the controller 40 or another select device. A second channel comprises CPE3 having inband circuitry 21 coupled to CU3 which also has inband circuitry 21. Both CPE3 and CU3 are capable of participation in inband communications with the controller or another select device. The use of select devices comprising inband circuitry 21 is preferred, however existing devices can operate in the system without employing such circuitry although these existing devices are not able to participate in inband communications. For example, both CPE 24 and CU24 operate normally in the system despite not having inband circuitry 21.

Figure 3A:
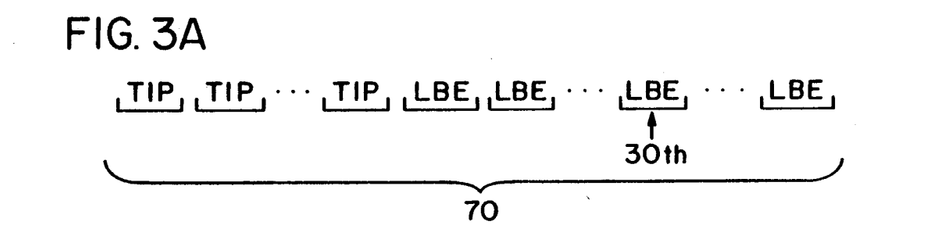
FIG. 3A illustrates an inband communication sequence used to establish inband communications in accordance with the present invention.

Referring to FIG. 3A, a preferred sequence 70 is transmitted by the inband circuitry 21 for initiating inband communications. The number and types of bytes of the sequence 70 have been selected to include a normally suppressed data sequence as well as a reset sequence for preventing inadvertant maintenance activation as explained below. However, other numbers of bytes can be used without departing from the scope of the invention. Since the two previously described suppression algorithms (AT&T and ANSI) are sufficiently similar, one series of data bytes may be defined that triggers either algorithm. In a communication system employing either suppression algorithm, transmission of 31 LBE bytes triggers suppression. To allow for a margin of error, the basic sequence 70 includes at least 32

LBE bytes. However, LBEs alone are insufficient since they could cause a 64 kbps CPE or an associated CU having a maintenance circuit which is waiting for LBEs to enter the mapping mode. To avoid this possibility, a plurality of TIP bytes precede the LBEs to reset the maintenance circuits of each device and prevent inadvertant activation of the maintenance circuit. Preferably, at least 40 TIPs are transmitted.

Figure 3B:
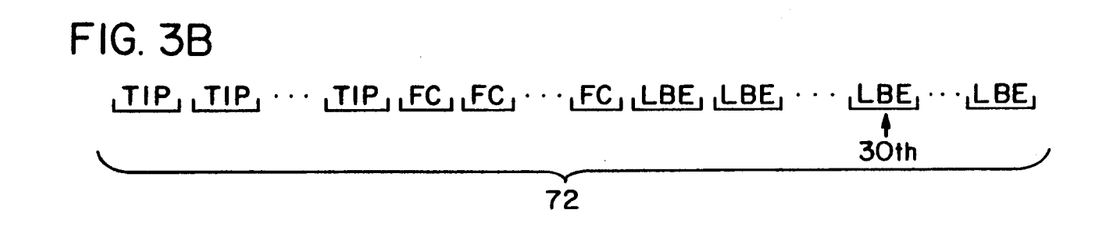
FIG. 3B illustrates an inband communication sequence used to establish inband communications for a cascaded select device.

To indicate it is available to participate in inband communications, a CPE 32 or a CU 19 employing inband circuitry 21 of the present invention transmits the inband sequence 70 shown in FIG. 3A. Note that in some architectures, a CPE or CU may not use this basic sequence 70 as some other sequence maybe be used or none at all may be used. To that end, a CPE or CU and the controller may exchange slightly longer sequences with each other for establishing inband communications. Referring to FIG. 3B, the sequence 72 differs from the basic sequence 70 in that a plurality of Function Code (FC) bytes are inserted between the TIP bytes and the LBE bytes. As stated previously, each FC byte is an 8-bit code typically associated with a device or device type in a system. In the present invention, the FCs are employed to identify the particular select device (CPE or CU) that is to participate an inband communications or the particular function to be performed via inband communications. To accommodate embodiments in which select devices are arranged in cascade, the FCs are employed to identify the device or device type being addressed. Accordingly, each select device is configured to recognize a particular FC byte for individual participation in inband communications.

One application of the present invention involves employing the sequences 70 and 72 to establish inband communications between a controller and a select CU 19 or a select CPE 32. Once inband communications is established with the CU 19 or CPE 32, the controller 40 can automatically provision diagnose, retrieve alarms and determine the state of the select device.

For example, referring back to FIG. 1, a newly installed select device such as CU2 is initially in a Just Power Up (JPU) state when installed into the system and requires provisioning by the controller 40. While in the JPU state, the inband circuitry 21 may indicate the presence of CU2 in the system by transmitting the inband sequence 70. To be properly configured to accept provisioning data, CU2 receives the sequence 72 from the controller 40 which causes CU2 to enter an inband communication link state. Recall that the sequence 72 includes FC bytes which are recognized by the inband circuitry for CU2 such that the device enters the inband state. After receiving the proper sequence actual provisioning of CU2 or any other network function can take place.

Figure 4:
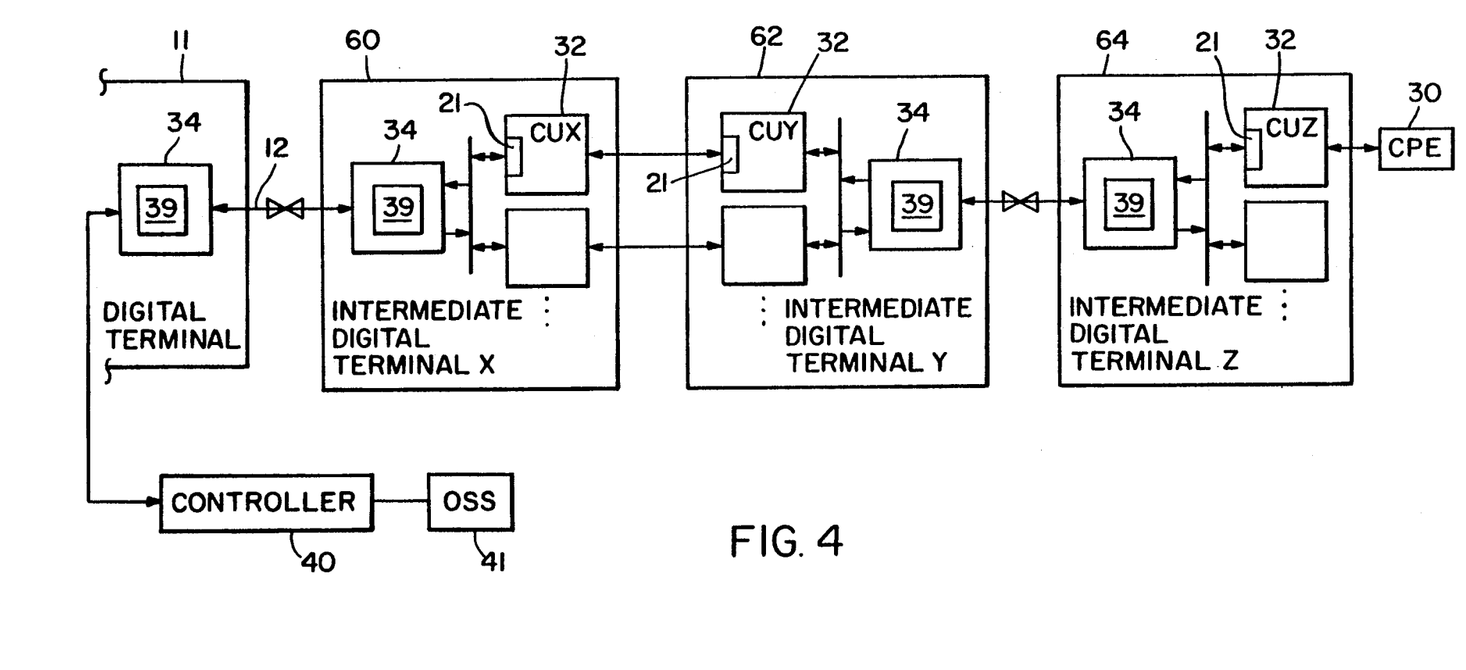
FIG. 4 is a block diagram of a plurality of remote digital channel units connected in a series arrangement and employing the present invention.

Devices having inband circuitry can also be situated at remote locations and arranged in a cascaded configuration as shown in FIG. 4. In one channel, an existing CPE 30 is coupled to the digital terminal 11 via the digital communications line 12 and three intermediate digital terminals 60, 62 and 64. More specifically, the three digital terminals 60, 62 and 64 each comprise a cascaded CU 32 (CUX, CUY and CUZ respectively) having inband circuitry 21. As such, any of the three CUs 32 are capable of participating in inband communications with the controller 40.

Figure 3C:
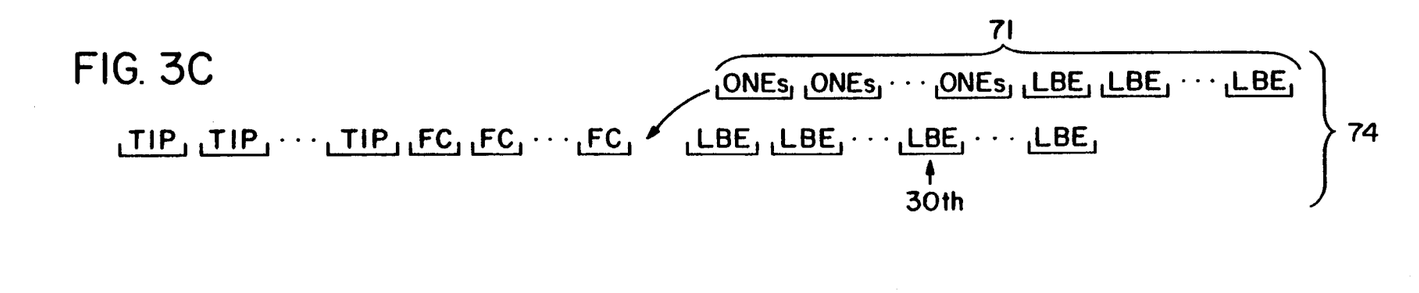
FIG. 3C illustrates an alternate longer inband communication sequence used to establish communications for a cascaded select device.

To support a system in which multiple select devices (CUs and/or CPEs) are cascaded, an additional sequence 71 is inserted into the sequence 72 to produce an cascade sequence 74 as shown in FIG. 3C. The sequence 71 comprises N-iterations of at least 30 bytes of ALL ONEs and at least 32 bytes of LBEs. The number of iterations of ALL ONEs and LBEs in the cascade sequence 74 depends on the number of devices between the controller and the downstream select device.

Referring back to FIG. 4, suppose that a downstream select device (CUY) indicates that it is available to participate in inband communications by transmitting the sequence 70. Note that CUY is separated from the controller 40 by an upstream select device (CUX). As such, the controller transmits the cascade sequence 74 which includes a single iteration (i.e. N=1) of the sequence 71. The devices CUX and CUY begin receiving the sequence 70. When CUX receives the 30th LBE of the sequence 70, it enters the mapping mode and the output of CUX becomes disabled. This condition temporarily prevents CUY from receiving data bytes. CUX then receives the ALL ONEs bytes of the sequence 71 causing it to enter a transparent state. When CUX enters this transparent state, data bytes from the controller 40 are able to pass through CUX to downstream units such as CUY. Thus, CUY receives the 32 LBEs that follow the ALL ONEs and the additional LBEs (See FIG. 3C). After receiving the additional LBEs, CUY is capable of participating in inband communications.

Figure 5A:
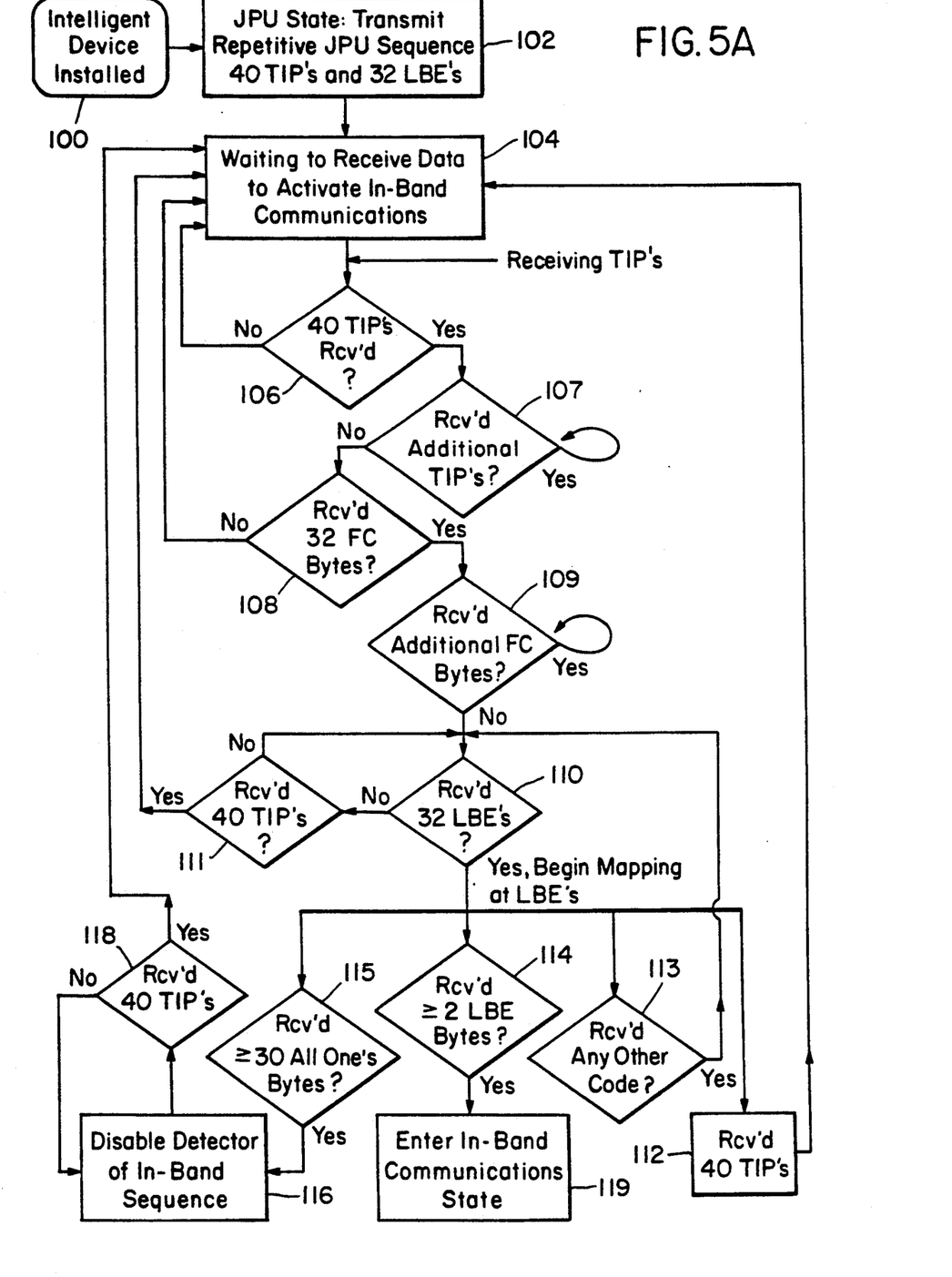
FIGS. 5A and 5B is a flow chart of a method used to establish inband communications between a select device and a controller.
Figure 5B:
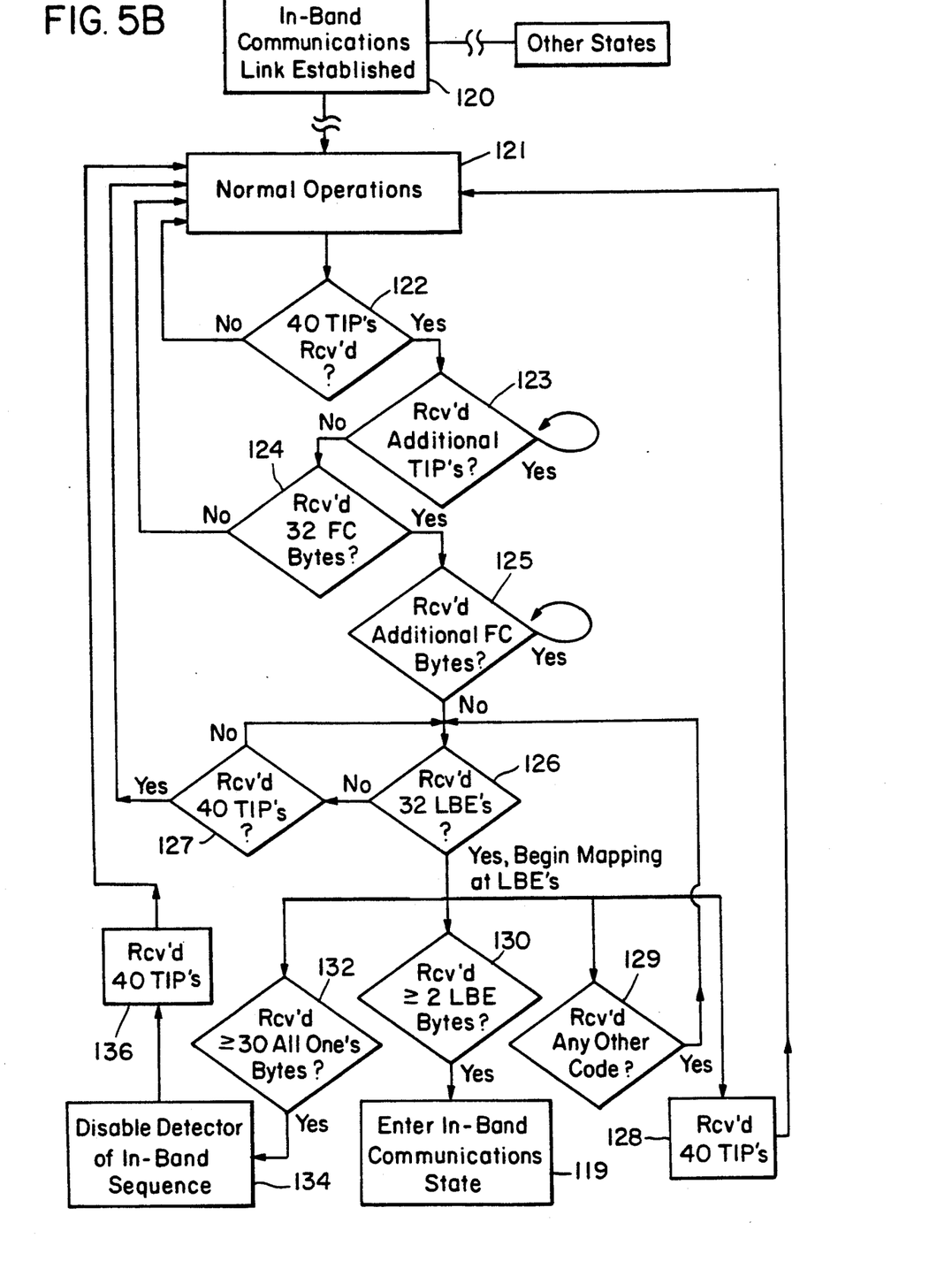

FIG. 5 shows a flow chart which illustrates the sequence of steps needed for a provisionable device, such as a CU, to enter the just-powered-up (JPU) state and to proceed to the inband communications link (IBC) state. The initial step 100 is the installation of the select device (CU). Once installed, the device enters the JPU state and may initiate the basic sequence 70 as shown in step 102. To that end, a repetitive sequence of 40 TIPs followed by 32 LBEs is transmitted. Note these byte numbers are examples and other byte numbers may be used without departing from the scope of the invention.

The inband circuit of the CU subsequently monitors its received data as shown in step 104 to determine when the IBC state has been achieved. After receiving the JPU sequence, the controller begins repeatedly transmitting the sequence 72, or optionally the cascade sequence 74. To that end, 40 TIPs are counted by the inband circuitry 21 as shown in step 106. If forthcoming, additional TIPs are detected in step 107. If no additional TIPs are detected, the sequence is monitored in step 108 to determine whether at least 32 FC's are received. If less than 32 FCs are received, the inband circuitry of the CU returns to the initial state. The CU monitors the incoming sequence for additional FC's in step 109 or LBEs in step 110. If the CU receives 32 LBEs it advances to the next state. If not, the CU checks if TIPs are received and returns to the initial state if 40 TIPs are received in step 111.

If at least 2 more LBEs are received in step 114, the circuitry continues to receive the additional LBEs and map them into a map code downstream. If the condition of step 114 is satisfied, the CU enters the IBC state as shown in step 119. After completing the information exchange in step 120 with the controller, the CU returns to the normal operations mode upon receipt of 40 TIPs (step 121). However, if the CU receives at least 30 ALL ONE bytes (step 115) then it enters a transparent state at step 116. This state is entered when the CU is between the controller and the designed select device for inband communications. This transparent state is exited upon receipt of 40 TIPs as shown in step 118. If the CU receives some sequence other than LBEs or ALL ONEs, it returns to the waiting for LBE state (see step 113). Furthermore, receipt of 40 TIPs, resets the device to the initial state (step 112).

Steps 122-136 provide the sequence of operations employed for the controller to establish an IBC with a select device already in service. Note that steps 112-136 may also be employed by an in-service select CU for establishing IBC with the controller. Assuming that the select CU is already in service, its inband circuitry counts TIPs as shown in steps 122-123. Once at least 40 TIPs are detected, the sequence is monitored in steps 124-125 to determine whether at least 32 FCs are received. As stated previously, if the CU is not directly connected to the controller, it receives 30 LBEs followed by the mapping output. As such, it loops through step 127 and returns to step 126 to wait for the requisite number of LBEs. If 32 LBEs are received in step 126, the sequence is further monitored in steps 128-130 and 132. As before, if it is desired to establish an IBC link with a select device that is not directly connected to the controller, a sequence of 30 ALL ONEs bytes followed by 32 LBEs is transmitted after the FC sequence to place an intermediate select device in a transparent state. This additional ALL ONEs/LBE sequence is repeated for each select device between the controller and the desired select device. Thus, if the CU receives at least 30 ALL ONEs bytes at step 132, it enters a transparent state at step 134. A sequence of 40 TIPs is required to cause the CU to exit the transparent state (step 136). If the CU receives some other sequence, it returns to step 129 and waits for LBEs. If the condition of step 130 is satisfied, the CU enters the IBC state as shown in step 119.

Equivalents

Those skilled in the art will recognize or be able to ascertain, using no more than routine experimentation, many equivalents to the specific embodiments of the invention described herein. These and all other equivalents are intended to be encompassed by the following claims.

I claim:

1. Apparatus for establishing inband digital communications between a controller and a selected unit of a time division multiplexed digital communication system to the exclusion of non-selected units using a communications time slot common to both the selected and non-selected units, comprising:
    a) a transmitter at the controller for:
        (i) transmitting a first sequence of X number of Transition in Progress bytes in said time slot, each Transition in Progress byte having a bit sequence which resets a predetermined circuit in all said units wherein X is at least 40;
        (ii) transmitting a second sequence of Y number of Function Code bytes in said time slot, each Function Code byte having a bit sequence which corresponds to an identification code associated only with a particular selected unit with which inband communication is to be established wherein Y is at least 32;
        (iii) transmitting a third sequence of Z number of Loop Back Enable bytes in said time slot, each Loop Back Enable byte having a bit sequence which is suppressed in normal digital communication, such that a selected unit in an inband communications state, upon receipt of said third sequence, establishes inband communication with the controller and wherein Z is at least 32; and
    b) a receiver at the selected unit for receiving the first, second, and third sequences and upon receipt of said second sequence entering into said inband communication state and upon receipt of at least said third sequence establishing inband communication in said time slot with the controller.

2. The apparatus of claim 1 wherein the predetermined circuit which is reset is a maintenance circuit.

3. Apparatus for establishing inband digital communications between a controller and a selected unit of a time division multiplexed digital communication system to the exclusion of non-selected units using a communications time slot common to both the selected and non-selected units, comprising:
    a) a transmitter at the selected unit for:
        (i) transmitting a first sequence of X number of Transition in Progress bytes in said time slot, each Transition in Progress byte having a bit sequence which resets a predetermined circuit in all said units;
        (ii) transmitting a second sequence of Y number of Function Code bytes in said time slot, each Function Code byte having a bit sequence which corresponds to an identification code associated only with a selected unit with which communication is to be established with the controller, such that said selected unit may be identified by said controller;
        (iii) transmitting a third sequence of Z number of Loop Back Enable bytes in said time slot, each Loop Back Enable byte having a bit sequence which is suppressed in normal digital communication; and wherein X is at least 40 and Y and Z are at least 32; and
    b) a controller which upon receipt of said second sequence identifies said selected unit and upon receipt of said third sequence establishes inband communication with the selected unit in said time slot.

4. The apparatus of claim 3 wherein the predetermined circuit which is reset is a maintenance circuit.

5. Apparatus for establishing inband digital communication between a controller and a selected unit of a time division multiplex digital communication system to the exclusion of non-selected units using a communications time slot common to both selected and non-selected units and wherein said units are connected in cascade via digital terminals and more than one unit may have an identification code which is the same as an identification code of a unit in another terminal, comprising:
    a) a transmitter at the controller for:
        (i) transmitting in said time slot a first sequence of X number of Transition in Progress bytes, each Transition in Progress byte having a bit sequence which resets a predetermined circuit in all said units;
        (ii) transmitting in said time slot a second sequence of Y number of Function Code bytes, each Function Code byte having a bit sequence which corresponds to an identification code associated with a particular selected unit to which inband communication is to be established;
        (iii) transmitting in said time slot a third sequence of disable bytes for disabling each unit having the same identification code as the particular selected unit which is located between the controller and the selected unit;

(iv) transmitting in said time slot a fourth sequence of Z number of Loop Back Enable bytes, each Loop Back Enable byte having a bit sequence which is suppressed in normal digital communication and wherein X, Y and Z are integral numbers equal to or greater than 32; and b) a selected unit for receiving the first, second, third and fourth sequences and upon receipt of said second sequence entering into an inband communication state and upon receipt of said fourth sequence establishing inband communication with the controller.

6. The apparatus of claim 5 in which the predetermined circuit is a maintenance circuit.

7. A method for establishing inband digital communication between a controller and a selected unit of a time division multiplexed digital communication system to the exclusion of non-selected units using a communications time slot common to both the selected and non-selected units, comprising the steps of:

a) transmitting in said time slot a first sequence of X number of T type bytes, each T type byte having a bit sequence which resets a predetermined circuit in all said units;

b) transmitting in said time slot a second sequence of Y number of F type bytes, each F type byte having a bit sequence which corresponds to an identification code associated only with a particular selected unit with which inband communication is to be established, such that upon receipt of said second sequence by said particular selected unit, the selected unit enters into an inband communication state; and c) transmitting a third sequence of Z number of L type bytes, each L type byte having a bit sequence which is suppressed in normal digital communication, such that the selected unit in the inband communication state, upon receipt of said third sequence, establishes inband communication with the controller and wherein X, Y and Z are integers equal to or greater than 32, the T type bytes are Transition in Progress bytes and the L type bytes are Loop Back Enable bytes and the F type bytes are Function Code bytes coded with the identity of a selected unit.

8. The method of claim 7 wherein the predetermined circuit is a maintenance circuit.

9. A method for establishing inband digital communication between a controller and a selected unit of a time division multiplexed digital communication system to the exclusion of non-selected units using a communications time slot common to both the selected unit and the non-selected units, comprising the steps of:

a) transmitting in said time slot a first sequence of X number of Transition in Progress bytes, each Transition in Progress byte having a bit sequence which resets a predetermined circuit in all said units;

b) transmitting in said time slot a second sequence of Y number of Function Code bytes, each Function Code byte having a bit sequence which corresponds to an identification code associated only with a particular selected unit with which inband communication is to be established, such that said particular selected unit may be identified by said controller;

c) transmitting in said time slot a third sequence of Z number of Loop Back Enable bytes, each Loop Back Enable byte having a bit sequence which is suppressed in normal digital communication, such that a controller upon receipt of said third sequence, establishes inband communication with an identified unit and wherein X, Y and Z are integers at least equal to 32.

10. A method for establishing inband digital communication between a controller and a selected unit of a time division multiplexed digital communication system to the exclusion of non-selected units using a communications time slot common to both the selected and non-selected units and wherein said units are connected in cascade via digital terminals and wherein more than one unit may have an identification code which is the same as an identification code of a unit in another terminal, comprising the steps of:

a) transmitting in said time slot a first sequence of X number of Transition in Progress bytes, each Transition in Progress byte having a bit sequence which resets a predetermined circuit in all said units;

b) transmitting in said time slot a second sequence of Y number of Function Code bytes, each Function Code byte having a bit sequence which corresponds to an identification code associated only with a particular selected unit with which inband communication is to be established, such that said particular selected unit enters an inband communication state;

c) transmitting in said time slot a third sequence of disable bytes for disabling each unit having the same identification code which is located between the controller and the particular selected unit while leaving the particular selected unit non-disabled;

d) transmitting in said time slot a third sequence of Z number of Loop Back Enable bytes, each Loop Back Enable byte having a bit sequence which is suppressed in normal digital communication, such that the non-disabled selected unit in the inband communications state, upon receipt of said fourth sequence, establishes inband communication in said time slot with the controller and wherein X, Y and Z are integers at least equal to 32 and the disable bytes comprise a series of at least 30 ONE bits and at least 32 Loop Back Enable bytes.

11. The method of claim 10 wherein the predetermined circuit is a maintenance circuit.

* * * * *